United States Patent
Geprägs et al.

(10) Patent No.: US 6,262,194 B1
(45) Date of Patent: Jul. 17, 2001

(54) PRODUCTION OF HOMOCOPOLYMERS, CO-POLYMERS OR BLOCK COPOLYMERS FROM CYCLOOLEFINICMONOMER UNITS

(75) Inventors: Michael Geprägs, Bobenheim-Roxheim; Joachim Queisser, Mannheim; Bernhard Rieger; Adnan S. Abu-Surrah, both of Ulm, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/402,541

(22) PCT Filed: Mar. 26, 1998

(86) PCT No.: PCT/EP98/01803

§ 371 Date: Oct. 6, 1999

§ 102(e) Date: Oct. 6, 1999

(87) PCT Pub. No.: WO98/45342

PCT Pub. Date: Oct. 15, 1998

(30) Foreign Application Priority Data

Apr. 8, 1997 (DE) .............................. 197 14 532

(51) Int. Cl.⁷ ................... C08F 2/04; C08F 4/60
(52) U.S. Cl. ............ 526/89; 526/172; 526/281; 526/282; 502/162; 502/257
(58) Field of Search ................. 526/172, 281, 526/282, 89; 502/162, 257

(56) References Cited

U.S. PATENT DOCUMENTS 2,721,189  10/1955  Anderson et al. .

FOREIGN PATENT DOCUMENTS 758 657     2/1997   (EP) .
96/37526   11/1996  (WO) .
96/37529   11/1996  (WO) .

OTHER PUBLICATIONS

J. Mol. Catalysis, 76 (1992) 219–228, Seehof et al.
J. Org. Chem. 512 (1996) 243–251, Abu–Srrah.
Goodall et al., Proceedings of the 6$^{th}$ Int. Bus. Forum on Speciality Polyolefins (SPO '96).
Rieger et al., Synthesis and structure of chiral Pd (II) complexes bearing ethylene–bridged bisindolinyl–and bis (1,2,3,4–tetrahydroquinolinyl) ligands, JOMC 512 (1996) 243–251, 1996.*

* cited by examiner

Primary Examiner—David W. Wu
Assistant Examiner—R. Harlan
(74) Attorney, Agent, or Firm—Keil & Weinkauf

(57) ABSTRACT

The invention relates to the production of homopolymers, co-copolymers or block copolymers from cycloolefinic monomer units characterized in that polymerization occurs in the presence of a catalyst of general formula (I), and optionally in the presence of an additive, wherein the substituents and indices have the following meaning: M is a metal from group VIII B of the periodic table of elements; $E_1$, $E_2$ are independently from each other an element from group V A of the periodic table of elements; Z is a bridging structural unit; Ar stands for annelated aryl units independent of each other; $L_1$, $L_2$ stands for formally uncharged Lewis base ligands; X means monovalent or bivalent anions; k means 1 or 2; l, m, n represent 1 or 2, whereby m×n=1.

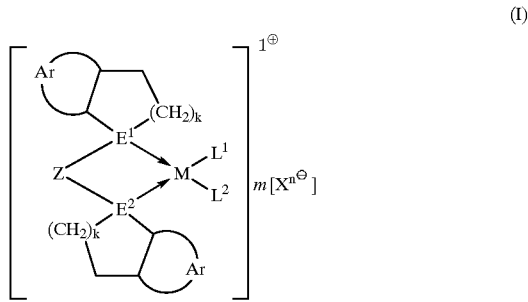

11 Claims, No Drawings

PRODUCTION OF HOMOCOPOLYMERS, CO-POLYMERS OR BLOCK COPOLYMERS FROM CYCLOOLEFINICMONOMER UNITS

Preparation of homopolymers, copolymers or block copolymers comprising cycloolefinic monomer units The present invention relates to a process for preparing homopolymers, copolymers or block copolymers comprising cycloolefinic monomer units. The invention further relates to homopolymers, copolymers and block copolymers comprising cycloolefinic monomer units whose polymer chains have hydroxyl end groups. In addition, the invention relates to the use of a metal catalyst in the preparation of homopolymers, copolymers or block copolymers comprising cycloolefinic monomer units.

Processes for the polymerization of, in particular, strained cycloolefins such as norbornene go back to work by Andersen and Merckling who availed themselves of the method of ring-opening metathesis polymerization for this purpose (cf. U.S. Pat. No. 2,721,189). The addition homopolymerization of norbornene to give 1,2-linked, saturated polymers is achieved according to Seehof et al., J. Mol. Catal. 1992, 76, 219 using the cationic palladium complex $[Pd(CH_3CN)_4](BF_4)_2$ in the homogeneous phase. Likewise cationic transition metal complexes, in particular nickel complexes, are described by Goodall et al., Proceedings of the Sixth International Business Forum on Speciality Polyolefins (SPO '96) as highly active catalysts for the addition polymerization of norbornene. Subject to the condition that the cationic metal center forms exclusively coordinate bonds to olefinic ligands and a δ bond to a carbon atom, polynorbornene derivatives having high molecular weights $M_n$ (>1,000,000 g/mol) are obtained at short reaction times. These polymer products are readily soluble in simple hydrocarbon solvents such as heptane or cyclohexane. However, the complexes used, eg. $[Pd(NCCH_3)_4](BF_4)_2$ or $[(\eta^3\text{-allyl})M(COD)]^+PF_6^-$ and $[(\eta^3\text{-allyl})M(COD)]^+PF_6^-$ (where M is nickel or palladium and COD=cycloocta-1,4-diene), are extremely sensitive to oxygen and moisture and can be synthesized only with difficulty. In addition, the complexes described by Goodall et al. do not have a rigid coordination sphere which straight away greatly reduces the possibility of stereocontrol or regiocontrol in linking reactions.

Abu-Surrah et al., J. Organomet. Chem. 1996, 512, 243–251, describe chiral Pd(II) complexes which are stabilized by means of bridged, bidentate, tertiary amine ligands, but without giving information about their specific catalytic usefulness.

It is an object of the present invention to provide a process for the preparation of polymers comprising cycloolefinic monomer units which makes possible high yields and short reaction times with retention of the ring structure together with good reaction control and unproblematical catalyst handling.

We have found that this object is achieved by a novel process for preparing homopolymers, copolymers or block copolymers comprising cycloolefinic monomer units, wherein the polymerization of the monomer units is carried out in the presence of a catalyst of the formula (I)

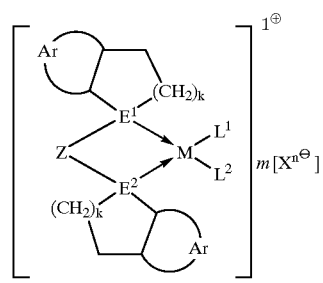

(I)

where the substituents and indices have the following meanings:

M is a metal from group VIII B of the Periodic Table of the Elements, $E^1$, $E^2$ are each, independently of one another, an element from group VA of the Periodic Table of the Elements, Z is a bridging structural unit comprising one, two, three or four substructural units of elements of groups IVA, VA and VIA of the Periodic Table of the Elements, Ar are, independently of one another, fused-on aryl units, $L^1$, $L^2$ are formally uncharged Lewis base ligands, X are monovalent or divalent anions, k is 1 or 2, l, m, n are 1 or 2, where m×n=l, and, if desired, an additive.

Furthermore, we have found a novel process for preparing homopolymers, copolymers or block copolymers comprising cycloolefinic monomer units in which the polymerization of the monomer units is carried out in the presence of the above-described catalyst of the formula (I) and in the presence of an additive containing a polarized double bond.

We have also found homopolymers, copolymers and block copolymers comprising cycloolefinic monomer units whose end groups have hydroxyl units.

Also found has been the use of the metal complexes of the formula (I) as catalyst in the polymerization of cycloolefinic monomer units.

The catalysts used for the process of the present invention are preferably metal complexes which have the formula (I) below:

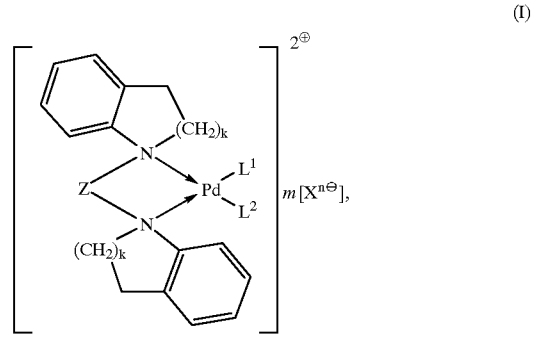

(I)

where the substituents and indices have the following meanings:

Z is methylene, 1,2-ethylene, 1,3-propylene or 1,4-butylene, $L^1$, $L^2$ are formally uncharged Lewis base ligands, X are monovalent or divalent anions, k is 1 or 2, m, n are 1 or 2, where m×n=2.

Suitable polymerization catalysts are in general metal compounds of the eighth transition group of the Periodic Table of the Elements (VIII B) which are in the form of a defined metal is complex (I). For the purposes of the present invention, a defined metal complex is preferably a compound which is prepared separately before use in the polymerization process. The active catalyst species can, however, likewise be generated in situ. If desired, additives having an activating action can be added to the metal compounds.

Suitable metals M are, apart from iron, cobalt, ruthenium, rhodium, osmium, iridium or platinum, preferably the metals nickel and palladium, with particular preference being given to palladium. The metals nickel, palladium and platinum essentially have a formal double positive charge in the complexes; iron, ruthenium and osmium generally have a single positive charge and cobalt and rhodium generally have a single or triple, preferably single, positive charge.

Suitable elements $E^1$, $E^2$, which can interact coordinatively with the metal center in (I) are the elements of main group V of the Periodic Table of the Elements (group VA), ie. nitrogen, phosphorus, arsenic, antimony or bismuth. Particularly suitable elements are nitrogen or phosphorus, in particular nitrogen. In a metal complex, $E^1$ and $E^2$ do not necessarily have to be identical. However, $E^1$ and $E^2$ are preferably identical, with preference being given to nitrogen.

The bridging structural unit Z connects the two elements $E^1$ and $E^2$ to one another. Z can be formed by linked substructural units each consisting of an atom of group IVA, VA or VIA of the Periodic Table of the Elements, where the possible free valences of these bridging atoms can be variously occupied, for example by substitution by hydrogen or by functional groups based on elements of groups IVA, VA, VIA and VIIA of the Periodic Table of the Elements, eg. silyl, alkyl, amino or alkoxy groups or halogen. The substituents can form ring structures with one another or with the bridging atom. Accordingly, the bridging structural unit Z can be, for example, a saturated or unsaturated carbon chain having up to four carbon atoms, where individual carbon atoms of the chain may be replaced by elements of groups IVA, VA and VIA of the Periodic Table of the Elements. For example, ether-, thioether-, amino-, phosphino-, imino- or sila-bridged systems Z are possibilities. Likewise, for example when $E^1=E^2=$phosphorus, heteroatom-terminated bridging structural units Z such as —O—$(CH_2)_2$—O— are possible. The bridging structure Z can also be terminated by non-identical substructural units, eg. by an N atom and a C atom, as in —N(R*)—$CH_2$— or —N(R*)—$(CH_2)_2$— (R* is, for example, hydrogen, alkyl or aryl).

Readily bridging structural units Z are those comprising one, two, three or four elements from group IVA of the Periodic Table of the Elements, for example methylene (—$CH_2$—), 1,2-ethylene (—$CH_2CH_2$—), 1,3-propylene (—$CH_2CH_2CH_2$—), 1,4-butylene, 1,3-disilapropylene (—$R^bR^aSi$—$CH_2$—$SiR^aR^b$, where $R^a$, $R^b$ are $C_1$–$C_{10}$-alkyl or $C_6$–$C_{10}$-aryl), ethylidene ($CH_3(H)C=$), 2-propylidene (($CH_3)_2C=$), diphenylmethylene (($C_6H_5)_2C=$) or orthophenylene.

Particularly suitable bridging structural units are 1,2-ethylene, 1,3-propylene and 1,4-butylene, with 1,2-ethylene being particularly preferred.

Suitable radicals Ar are, for example, aromatic radicals fused onto the heterocycle containing the bridging atom $E^1$ or $E^2$, in particular aryl units fused on in the ortho position. For example, Ar can be a fused-on benzene ring, a fused-on naphthyl unit or a fused-on pyrrolidine ring. The radicals Ar may be either substituted, for example by functional groups based on elements of groups IVA, VA, VIA and VIIA of the Periodic Table of the Elements, eg. silyl, alkyl, carboxy, ester, amide, amino, hydroxy, alkoxy or phosphate groups or halogen, or unsubstituted. Ar is preferably an unsubstituted, fused-on benzene ring. The two aromatic units Ar present in the metal complex (I) are preferably identical radicals.

As chelating ligands, ie. as units coordinatively bound via $E^1$ and $E^2$ to the metal M, preference is given to using 1,2-bis(N-indolinyl)ethane or 1,2-bis(N-1,2,3,4-tetrahydroquinolinyl)-ethane.

Suitable formally uncharged ligands $L^1$, $L^2$ are Lewis bases in general, ie. Lewis base compounds having at least one free electron pair, preferably organic compounds or water.

Well suited ligands are Lewis bases whose free electron pair or pairs is/are located on a nitrogen or oxygen atom, ie. nitriles, ketones, ethers or preferably water.

Suitable Lewis bases which may be mentioned are $C_1$–$C_{10}$-nitriles such as acetonitrile, propionitrile, benzonitrile, $C_3$–$C_{10}$-ketones such as acetone or acetylacetone or else $C_2$–$C_{10}$-ethers such as dimethyl ether, diethyl ether or tetrahydrofuran.

Further compounds which are suitable as ligands $L^1$, $L^2$ in (I) are those of the formula (III)

$$T\text{—OH} \qquad (III).$$

Here, T is an organic $C_1$–$C_{15}$-radical provided with a group having Lewis base properties. Examples of well suited organic $C_1$–$C_{15}$-radicals are linear or cyclic —$(CH_2)_n$— units, where n is from 1 to 10, ie. methylene, 1,2-ethylene, 1,3-propylene, 1,4-butylene, 1,5-pentylene, 1,6-hexylene, 1,7-heptylene, 1,8-octylene, 1,9-nonylene or 1,10-decylene.

Suitable groups having Lewis base properties are ether, ester, ketone, amine, phosphine and, in particular, nitrile (—C≡N) or tertiary amine.

Well suited compounds T—OH are, for example, α-ω-hydroxynitriles such as NC—$(CH_2)_n$—OH, where n=1–10, or (2-hydroxymethyl)tetrahydrofuran, and also (2-hydroxymethyl)(N-organo)pyrrolidines (IIIa) or (2-hydroxymethyl)(N-organo)piperidines (IIIb)

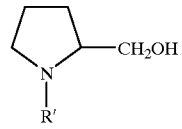

(IIIa)

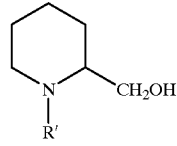

(IIIb)

where R' is $C_1$–$C_{10}$-alkyl or $C_3$–$C_{10}$-cycloalkyl, for example methyl, ethyl, n-propyl, i-propyl, n--butyl, i-butyl, s-butyl, t-butyl, cyclopentyl or cyclohexyl. R' can also be $C_6$–$C_{10}$-aryl such as phenyl or naphthyl, which may in each case bear inert radicals.

In particularly preferred embodiments of the process of the present invention, use is made of metal complexes (I) in which the formally uncharged Lewis base ligands $L^1$, $L^2$ are acetonitrile or $H_2O$, with particularly good results being achieved when $L^1$ and $L^2$ are $H_2O$.

Examples of suitable anions X in (I) are perchlorate, sulfate, phosphate, nitrate and carboxylates such as acetate, trifluoroacetate, trichloroacetate, propionate, oxalate, citrate and benzoate, as well as conjugated anions of organosulfonic acids, eg. methylsulfonate, trifluoromethylsulfonate and p-toluenesulfonate, also tetrafluoroborate, tetraphenylborate, tetrakis(pentafluorophenyl)borate, hexafluorophosphate, hexafluoroarsenate or hexafluoroantimonate. Preference is given to using perchlorate, trifluoroacetate, sulfonates such as methylsulfonate, trifluoromethylsulfonate and p-toluenesulfonate, tetrafluoroborate or hexafluorophosphate and, in particular, trifluoroacetate, perchlorate, tetrafluoroborate or p-toluenesulfonate as anion X.

In the process of the present invention, preference is in principle given to using any metal complexes which have $C_2$ symmetry. Moreover, it is likewise possible to use those metal complexes which are in the meso form. The metal complexes (I) can be used either as a mixture of diastereomers, as a mixture of enantiomers or as pure enantiomers or diastereomers.

Examples of suitable defined metal complexes (I) are diacetonitrile[1,2-bis(N-1,2,3,4-tetrahydroquinolinyl) ethane]-palladium bis(tetrafluoroborate) and diaquo[1,2-bis (N-1,2,3,4-tetrahydroquinolinyl)ethane]palladium bis (tetrafluoroborate). Particularly good results, eg. in respect of yield and conversion, are generally obtained using diaquo complexes ($L^1=L^2=H_2O$ in formula (I)). Examples of particularly suitable complexes are diaquo[1,2-bis(N-indolinyl) ethane]palladium(II) bis(tetrafluoroborate) and diaquo[1,2-bis(N-1,2,3,4-tetrahydroquinolinyl)ethane]palladium(II) bis (tetrafluoroborate).

The amount of catalyst is generally matched to the amount of monomer used, with the molar ratio of monomer to catalyst usually being in the range from 30:1 to 100,000:1. Preference is given to using ratios in the range from 200:1 to 5000:1, in particular from 300:1 to 2000:1. In general, the polymer yield increases in virtually direct proportion to an increasing molar ratio of starting monomer to catalyst.

The catalysts of the formula (I) are generally prepared by methods known from the literature, as described in Abu-Surrah et al., J. Organomet. Chem. 1996, 512, 243. Complexes such as bis(benzonitrile)palladium(II) dichloride can usually be reacted with bidentate nitrogen ligands such as 1,2-bis(N-indolinyl)-ethane or 1,2-bis(1,2,3,4-tetrahydroquinolinyl)ethane with ligand exchange to give the corresponding palladium dichloride complexes. These complexes can subsequently be treated with silver tetrafluoroborate in the presence of, for example, acetonitrile or water to convert them into the bisacetonitrile or diaquo complexes. The diaquo complexes are likewise obtained from the bisacetonitrile complexes by stirring in water. In general, the reactions described are carried out at room temperature.

Suitable complexes of usually divalent metals M are halides, sulfates, phosphates, nitrates and carboxylates, eg. acetates, propionates, oxalates, citrates and benzoates, and also sulfonic acid salts such as methylsulfonates, trifluoromethylsulfonates and p-toluenesulfonates. For cost reasons, preference is given to using chlorides.

In a further embodiment of the present invention, the preparation of polymers comprising cycloolefinic monomer units takes place in the presence of additive components which have a polarized double bond. These compounds themselves do not take part in the polymerization reaction and are accordingly not incorporated into the growing polymer chain. Nevertheless, an interaction with the catalyst species cannot be ruled out.

These additives effect an increase in the molecular weight $\overline{M}_w$ of the polymers and lead to a narrower molecular weight distribution $\overline{M}_w/\overline{M}_n$ (determined by means of gel permeation chromatography relative to polystyrene standards).

Suitable additive components having polarized double bonds are, for example, the esters of acrylic and methacrylic acid with $C_1$–$C_{10}$-alkanols. Suitable esters in this context are, inter alia, methyl acrylate, ethyl acrylate, t-butyl acrylate, n-butyl acrylate, i-butyl acrylate, ethylhexyl acrylate and the corresponding methacrylate derivatives. It is also possible to use mixtures of the compounds mentioned as additive component.

The molar ratio of starting monomer to additive is generally greater than 1:10, but preferably takes on values in the range from 1:5 to 1000:1 and particularly preferably in the range from 1:2 to 50:1.

Suitable cycloolefinic monomers are essentially all monomers of this class of compounds, ie. bridged and unbridged ring systems.

It is advantageous to use strained ring systems which have one or more olefinic bonds in the ring. For the purposes of the present invention, strained ring systems are in particular those in which the bond geometry of the double bond units displays deviations from corresponding free, unstrained systems. The deviations can be either that the bond angles in the $sp^2$ plane do not allow optimum overlapping of the participating orbitals, or that one bond is forced out of the $sp^2$ plane. Examples of suitable cycloolefinic monomer units are cyclopropene, cyclopentene, dicyclopentadiene, bicyclo [2.2.1]hept-2-ene or bicyclo[2.2.2]oct-2-ene, in each case also in substituted form, eg. substituted by alkyl groups, aryl groups or functional groups based on elements of groups IVA, VA, VIA or VIIA of the Periodic Table of the Elements, for example silyl, alkyl, carboxy, ester, amide, amino, hydroxy, alkoxy and phosphate groups or halogens.

Among the cycloolefinic monomers, particular preference is given to using norbornene (= bicyclo[2.2.1]hept-2-ene) and derivatives of norbornene. Norbornene derivatives for the purposes of the present invention are, for example, compounds in which the carbon valences which do not participate in ring formation are occupied by alkyl radicals such as methyl, ethyl, i-, n-propyl, i-, n-, s-, t-butyl, pentyl, hexyl, heptyl, octyl, nonyl, decyl or their structural analogs, by cycloalkyl radicals such as cyclopropyl, cyclopentyl, cyclohexyl, by aryl radicals such as phenyl or naphthyl or by alkylaryl radicals such as benzyl. Furthermore, it is possible to use norbornene derivatives containing functional groups based on elements of groups IVA, VA, VIA or VIIA of the Periodic Table of the Elements, for example silyl, alkyl, carboxy, ester, amide, amino, hydroxy, alkoxy and phosphate groups or halogens.

It is possible to use either monosubstituted or polysubstituted norbornene derivatives.

The process of the present invention enables both homopolymers and random copolymers and block copolymers to be obtained from the above-described cycloolefinic monomer units.

Examples of homopolymers are polymers of norbornene (= poly(2,3-bicyclo[2.2.1]hept-2-ene)), of dicyclopentadiene, of cyclopentene and of vinylcyclohexene.

The polynorbornene obtainable by the process of the present invention has a low solubility and glass transition temperatures (Tg) of greater than 300° C. and provides an amorphous transparent molding composition.

Possible copolymers are any binary, ternary or higher systems formed from mixtures of the monomer units mentioned. It is possible to prepare, inter alia, copolymers of norbornene and a norbornene derivative such as 2-(hydroxymethyl)bicyclo[2.2.1]hept-5-ene, bicyclo[2.2.1]hept-5-en-2-ylmethyl decanoate, bicyclo[2.2.1]hept-5-ene-2-carboxylic acid or methyl bicyclo[2.2.1]hept-5-ene-2-carboxylate.

Furthermore, block copolymers are obtainable by the process of the present invention by exploiting the living character of the transition metal-catalyzed polymerization. After polymerization of a certain amount of norbornene, the polymerization can be continued, for example, after addition of ethylene, styrene, methoxy- or hydroxy-substituted styrene, eugenol or 3-ethylidene-1-cyclohexene in the presence of diaquo[1,2-bis(N-indolinyl)ethane]palladium(II) bis (tetrafluoroborate) or diaquo[1,2-bis(N-1,2,3,4-tetrahydroquinolinyl)ethane]palladium(II) bis (tetrafluoroborate) to give a binary block copolymer. Higher block copolymer systems can also be prepared in a similar way.

Use of norbornene derivatives containing alkyl, aryl or alkylaryl radicals enables characteristic properties of the polymers, for example Tg and melting point, to be decisively influenced. Thus, homopolymers of bicyclo[2.2.1]hept-5-en-2-ylmethyl decanoate have a Tg of significantly below 300° C.

If metal complexes of the formula (I) with $L^1=L^2=H_2O$ are used as catalysts, polymers whose end groups have hydroxyl functions resulting from a reaction mechanism analogous to the Wacker oxidation are obtained. In this way, it is possible to obtain hydroxy-functionalized polynorbornene from norbornene. The OH groups can be used for subsequent reactions and offer the opportunity of manipulating the mechanical and rheological properties of the polymer molding composition, eg. by esterification.

The process of the present invention makes it possible to prepare homopolymers, copolymers and block copolymers comprising cycloolefinic monomer units and having mean molecular weights $\overline{M}_w$ of up to 2 million g/mol. Preference is given to obtaining polymers having mean molecular weights in the range from 5000 to 1 million g/mol, particularly preferably in the range from 40,000 to 500,000 g/mol and in particular in the range from 50,000 to 250,000 g/mol.

The molecular weight distributions $\overline{M}_n/\overline{M}_w$ obtained generally range from 1.05 to 3.5 and preferably take on values in the range from 1.1 to 2.2 (determined by means of gel permeation chromatography, based on a polystyrene standard).

The polymerization process of the present invention is generally carried out at reaction temperatures in the range from −40° C. to 100° C. Good results and good control of the reaction are generally possible at room temperature by means of said process using the catalysts and monomer units described.

The polymerization generally proceeds at atmospheric pressure. When the catalysts described are used, it is not necessary to carry out the polymerization with exclusion of air and moisture.

The polymerization can be carried out either in the absence of solvents or in the presence of inert solvents such as halogenated hydrocarbons, eg. dichloromethane or chlorobenzene. It is likewise possible to use solvent mixtures, in which case the inert component may be combined with, for example, functionalized aromatic compounds such as 1,2-dichlorobenzene or nitrobenzene.

The reaction times in the process of the present invention are usually in the range from 30 minutes to 24 hours. Good yields and conversions are achievable using reaction times of only 1–4 hours.

Based on the amount of monomer used, the catalyst can be used in a molar ratio in the range from 50:1 to 10,000:1 (starting monomer/catalyst) and preferably in the range from 250:1 to 2000:1.

The conversions achieved are generally in the range from 50 to 100%.

The process of the present invention enables homopolymers, copolymers and block copolymers comprising, in particular strained, cycloolefinic monomer units to be obtained with retention of the ring frameworks in an uncomplicated preparation using insensitive catalysts. The polymerization of norbornene proceeds regioselectively to give exclusively the 1,2-exo-linked addition product. The polynorbornene derivatives obtained are highly transparent, have a good heat distortion resistance and can be used for the production of medical apparatus and possibly also as a polycarbonate substitute.

The present invention is illustrated by the following examples:

EXAMPLES

The molecular weights $M_w$ and the molecular weight distribution $M_w/M_n$ were determined by gel permeation chromatography (GPC), based on a polystyrene standard.

IR measurements were carried out on a Bruker IFS113 spectrometer.

The DSC data were determined on a Perkin-Elmer DSC-7 instrument at a heating rate of 10° C./min.

The melting points were determined by means of a polarization microscope. The heating rate was set to 10° C./min.

The metal complexes rac-diacetonitrile[1,2-bis(N-indolinyl)ethane]palladium(II) bis(tetrafluoroborate) (C1), rac-diacetonitrile[1,2-bis(N-1,2,3,4-tetrahydro-quinolinyl)ethane]palladium(II) bis(tetrafluoroborate) (C2), rac-diaquo]1,2-bis(N-indolinyl)ethane]palladium(II) bis (tetrafluoroborate) (C3) and rac-diaquo[1,2-bis(N-1,2,3,4-tetrahydroquinolinyl)ethane]palladium(II) bis (tetrafluoroborate) (C4) were prepared as described in Abu-Surrah et al., J. Organomet. Chem. 1996, 512, 243–251.

General Procedures

I. Homopolymerization of norbornene (Experiments 1.01 to 1.08)

Norbornene (see Table 1) was added to a solution of the palladium(II) complex C1, C2, C3 or C4 (50 mg) in dichloromethane (50 ml), 1,2-dichlorobenzene (5.0 ml) and nitrobenzene (2.0 ml), the mixture was stirred for 1 hour at room temperature and the reaction was stopped by addition of an excess of methanol. The polymer product was filtered off, washed with methanol and dried under reduced pressure at 80° C.

The other experimental parameters and the polymer properties are shown in Table 1.

TABLE 1

Results of the norbornene polymerization

| Exp. | Cat. | Norbornene/Pd molar ratio | $10^{-4} \times \overline{M}_w$ g/mol a) | $\overline{M}_w/\overline{M}_n$ a) | Yield g | Conversion % |
|---|---|---|---|---|---|---|
| 1.01 | C1 | 600 | 7.5 | 1.31 | 3.50 | 70 |
| 1.02 | C2 | 600 | 21.0 b) | 1.42 | 2.90 | 58 |
| 1.03 | C3 | 600 | 7.1 | 1.46 | 4.83 | 97 |
| 1.04 | C4 | 600 | 8.9 | 2.17 | 4.60 | 92 |
| 1.05 | C4 | 50 | 6.5 | 1.84 | 0.22 | 55 |
| 1.06 | C4 | 100 | 7.2 | 1.91 | 0.55 | 70 |
| 1.07 | C4 | 300 | 8.7 | 2.02 | 2.07 | 89 |
| 1.08 | C4 | 1000 | 8.2 | 1.62 | 6.31 | 81 | a) Determined by means of gel permeation chromatography (GPC), based on a polystyrene standard.
b) Based on a linear polyethylene standard.

II. Polymerization of norbornene in the presence of methyl acrylate (Experiments 2.01 to 2.05)

Norbornene (5.0 g) and methyl methacrylate (see Table 2) were added to a solution of C4 (0.5 mg) in dichloromethane (50 ml), 1,2-dichlorobenzene (5.0 ml) and nitrobenzene (2.0 ml), the reaction mixture was stirred for 4 hours at room temperature and then transferred into a vessel containing methanol. The polymer material obtained was filtered off, washed with an excess of methanol and dried under reduced pressure at 80° C.

The other experimental parameters and the polymer properties are shown in Table 2.

TABLE 2

Results of the norbornene polymerization in the presence of methyl acrylate

| Exp. | Norbornene/acrylate molar ratio | Yield g | $10^{-4} \times \overline{M}_w$ g/mol a) | $\overline{M}_w/\overline{M}_n$ a) |
|---|---|---|---|---|
| 2.01 | 10.0 | 2.26 | 6.88 | 1.31 |
| 2.02 | 4.0 | 3.0 | 7.23 | 1.42 |
| 2.03 | 2.0 | 3.28 | 7.69 | 1.46 |
| 2.04 | 1.0 | 4.39 | 7.79 | 2.17 |
| 2.05 | acrylate/100% | — b) | — | — | a) Determined by means of GPC, based on a polystyrene standard.
b) No polymerization observed.

We claim:

1. A process for preparing homopolymers, copolymers or block copolymers comprising cycloolefinic monomer units, wherein the polymerization is carried out in the presence of a catalyst of the formula (I)

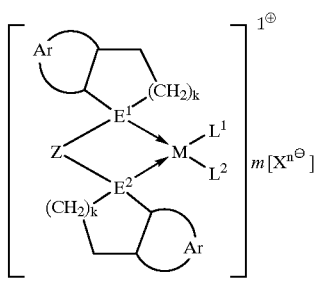

(I)

wherein the substituents and indices have the following meanings:
M is a metal from group VIII B of the Period Table of the Elements,
$E^1$, $E^2$ are each, independently of one another, an element from group VA of the Period Table of the Elements,
Z is a bridging structural unit comprising one, two, three or four substructural units of elements of groups IVA, VA and VIA of the Period Table of the Elements,
Ar are, independently of one another, fused-on aryl units,
$L^1$, $L^2$ are formally uncharged Lewis base ligands,
X are monovalent or divalent anions,
k is 1 or 2,
l, m, n are 1 or 2,
wherein m×n=l, and, if desired, an additive.

2. A process as claimed in claim 1, wherein the catalyst used is a compound of the formula (I)

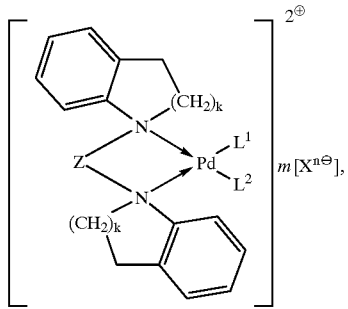

(I)

wherein the substituents and indices have the following meanings:
Z is methylene, 1,2-ethylene, 1,3-propylene or 1,4-butylene,
$L^1$, $L^2$ are formally uncharged Lewis base ligands,
X are monovalent or divalent anions,
k is 1 or 2,
m, n are 1 or 2,
wherein m×n=2.

3. A process as claimed in claim 1, wherein the catalyst used is a compound of the formula (I)

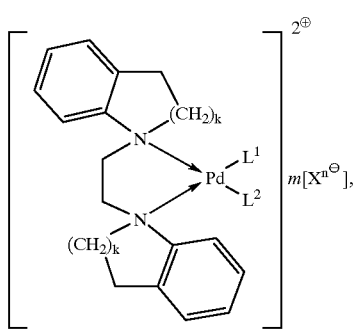

(I)

wherein the substituents and indices have the following meanings:
$L^1$, $L^2$ are $CH_3CN$ or $H_2O$,
X is tetrafluoroborate, perchlorate, p-toluenesulfonate or trifluoroacetate,
k is 1 or 2,
m is 2.

4. A process as claimed in claim 1, wherein the catalyst used is a compound of the formula (I) in which $L^1$ and $L^2$ are $H_2O$.

5. A process as claimed in claim 1, wherein the polymerization is carried out in the presence of an additive containing a polarized double bond.

6. A process as claimed in claim 1, wherein the additive used is an ester of acrylic or methacrylic acid with a $C_1$–$CH_{10}$-alkanol.

7. A process as claimed in claim 1, wherein the additive used is methyl acrylate.

8. A process as claimed in claim 1, wherein the initial ratio of cycloolefinic monomer unit to additive is greater than 1:10.

9. A process as claimed in claim 1, wherein the initial ratio of cycloolefinic monomer unit to additive is in the range from 1:5 to 1000:1.

10. A process as claimed in claim 1, wherein the cycloolefinic monomer units used are norbornene or norbornene derivatives.

11. A process for the preparation of homopolymers, copolymers or block copolymers comprising cycloolefinic monomer units in which the polymerization is carried out in the presence of catalysts of the formula (I)

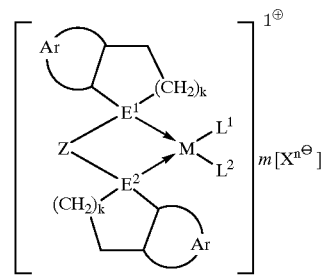
(I)

wherein the substituents and indices have the following meanings:
  M is a metal from group VIII B of the Periodic Table of the Elements,
  $E^1$, $E^2$ are each, independently of one another, an element from group VA of the Periodic Table of the Elements,
  Z is a bridging structural unit comprising one, two, three of four substructural units of elements of groups IVA, VA and VIA of the Periodic Table of the Elements,
  Ar are, independently of one another, fused-on aryl units,
  $L^1$, $L^2$ are formally uncharged Lewis base ligands,
  X are monovalent or divalent anions,
  k is 1 or 2,
  l, m, n are 1 or 2,
wherein m×n=l.

* * * * *

UNITED STATES PATENT AND TRADEMARK OFFICE
CERTIFICATE OF CORRECTION

PATENT NO. : 6,262,194 B1  
DATED : July 17, 2001  
INVENTOR(S) : Gepraegs et al.

Page 1 of 1

It is certified that error appears in the above-identified patent and that said Letters Patent is hereby corrected as shown below:

Title page,  
The title of the invention should read:  
-- PRODUCTION OF HOMOCOPOLYMERS, COPOLYMERS OR BLOCK COPOLYMERS FROM CYCLOOLEFINIC MONOMER UNITS --.

Column 9, claim 1,  
Line 47, after "units" insert -- by polymerization --.

Column 10, claim 2,  
Line 15, delete "the".

Signed and Sealed this

Twenty-ninth Day of January, 2002

Attest:

JAMES E. ROGAN  
Attesting Officer  
Director of the United States Patent and Trademark Office